July 5, 1966     J. HOFFMAN     3,258,977
GYRO DRIFT LIMITING SYSTEM

Filed Jan. 4, 1963     2 Sheets-Sheet 1

JAY HOFFMAN
INVENTOR.

BY *S. A. Giarratana*
*Francis L. Masselle*
ATTORNEYS

United States Patent Office 3,258,977
Patented July 5, 1966

3,258,977
GYRO DRIFT LIMITING SYSTEM
Jay Hoffman, Livingston, N.J., assignor to General Precision Inc., Little Falls, N.J., a corporation of Delaware
Filed Jan. 4, 1963, Ser. No. 249,440
9 Claims. (Cl. 74—5.34)

The invention relates to inertial systems, and more particularly to an inertial system in which the drift of a stable platform induced by linear acceleration, shock and vibration is limited by means of angular accelerometers.

When a gyro is subjected to disturbances such as high linear acceleration, vibration and shock, the drift rate of the gyro increases because of unbalance and anisoelasticity in the gyro. The gyros in the navigation or guidance system of a rocket are subjected to these disturbances during the boost phase of rocket flight, and hence the stable platform controlled by the gyros will drift during the boost phase of rocket flight at a relatively high rate. As a result the platform will drift from precise alignment when the rocket is launched, and the accuracy of the system is substantially degraded.

Accordingly, an object of the present invention is to reduce the drift of a stable platform when the gyros controlling the platform are subjected to high linear acceleration, vibration, and shock.

Another object of the present invention is to reduce the drift of a platform in a rocket guidance or navigation system during the boost phase of rocket flight.

A further object of the present invention is to increase the accuracy of inertial guidance or navigation systems.

A still further object of the present invention is to reduce the amount of drift of a stable platform caused by linear acceleration, vibration or shock.

These objects are accomplished in accordance with the present invention by mounting accelerometers on the platform to sense the angular acceleration of the platform about the axes of the platform. From these angular accelerometers output signals are generated proportional to the amount that the platform has drifted when the gyros of the platform are being subjected to the high linear acceleration, vibration, and shock. These output signals representing platform angle derived from the angular accelerometers are fed to the gyro torquers in a direction to oppose the drift of the platform about the axes. In this manner the drift of the platform is greatly reduced.

Figure 1:
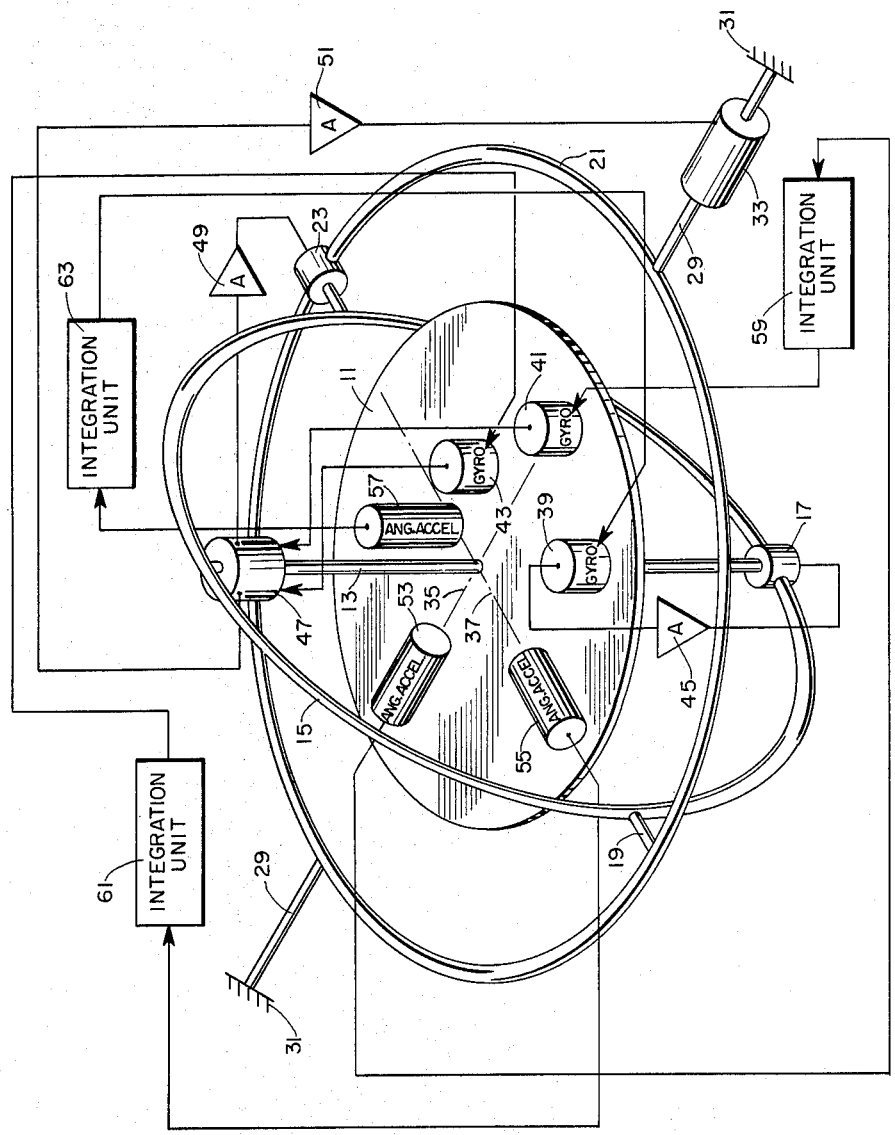
Figure 2:
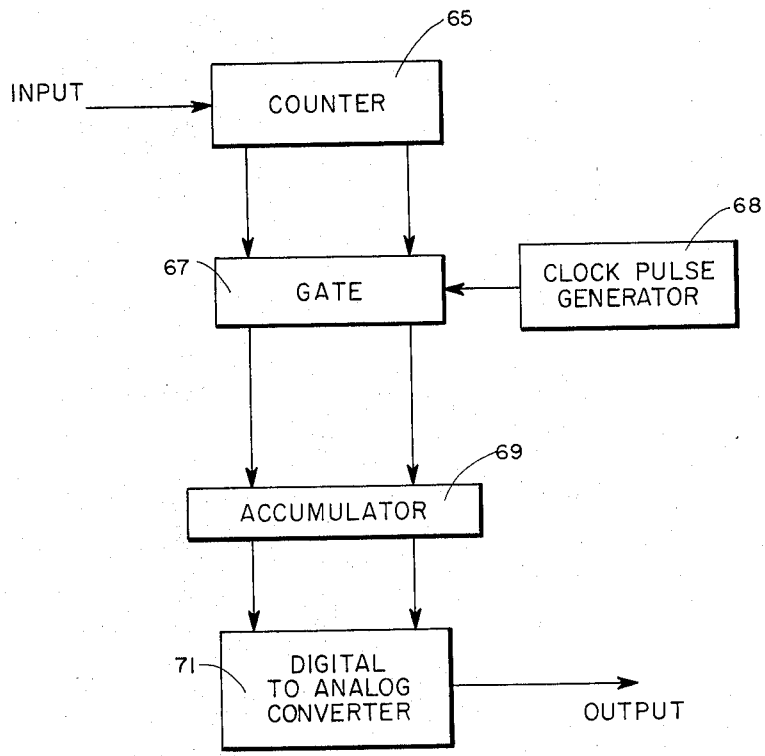

Many other advantages and objects of the present invention will become readily apparent as the following detailed description of the invention unfolds, and when taken in conjunction with the drawings wherein:

FIG. 1 schematically illustrates a stable platform incorporating the system of the present invention to reduce its drift; and FIG. 2 is a block diagram of an integration unit used in the system of the invention.

As shown in FIG. 1 a platform 11 is supported by a vertical gimbal axle 13, which in turn is rotatably supported by a gimbal frame 15. A gimbal torquer 17 is provided to rotate the platform 11 on the axle 13 with respect to the gimbal frame 15. The gimbal frame 15 is supported by gimbal axles 19 which are perpendicular to the axle 13. The axles 19 are rotatably mounted in a gimbal frame 21. A gimbal torquer 23 is provided to rotate the gimbal frame 15 on the axles 19 with respect to the gimbal frame 21. The gimbal frame 21 is supported by gimbal axles 29, which are perpendicular to the gimbal axles 19. The gimbal axles 29 are rotatably mounted with respect to the vehicle frame 31 in which the system is mounted. A gimbal torquer 33 is provided to rotate the gimbal frame 21 on the axles 29 with respect to the vehicle frame 31. The platform 11 has three mutually perpendicular axes defined therein, one of which is maintained vertical and the other two of which are maintained horizontal. The two horizontal axes are designated by the reference numbers 35 and 37. The vertical axis is coaxial with the gimbal axle 13. Three gyros 39, 41 and 43 are mounted on the platform 11 to sense the rotation of the platform 11 with respect to inertial space. The gyro 39 senses rotation of the platform 11 about its vertical axis and produces an output signal proportional to the amount that the platform 11 has rotated about its vertical axis from its initial position with respect to inertial space. The output signal of the gyro 39 is amplified by an amplifier 45 and then applied to the gimbal torquer 17, which in response to the amplified output signal from the amplifier 45 rotates the platform 11 on the axle 13 in a direction to eliminate the output signal from the gyro 39. In this manner, the angular position of the platform about its vertical axis is maintained fixed in its initial position with respect to inertial space. The gyro 41 senses rotation of the platform 11 about the horizontal axis 35 and the gyro 43 senses rotation of the platform 11 about the horizontal axis 37. The output signals of the gyros 41 and 43 are fed to a resolver 47 which senses the amount of rotation of the platform 11 about its vertical axis with respect to the gimbal frame 15 and resolves the signals applied from the gyros 41 and 43 through this angle. One output signal from the resolver 47 will be proportional to the amount of rotation of the platform 11 about a horizontal axis aligned with the gimbal axles 19. This output signal after being amplified by an amplifier 49 is fed to the gimbal torquer 23, which in response to this signal will rotate the gimbal frame 15 and thereby the platform 11 about this horizontal axis in a direction to eliminate this output signal from resolver 47. The other output signal of the resolver 47 will be proportional to the amount that the platform 11 is rotated about a horizontal axis perpendicular to the horizontal axis aligned with the axles 19. This output signal after being amplified by an amplifier 51 is fed to the gimbal torquer 33 which in response to this signal will rotate the gimbal frame 21 on the axle 29. When the gimbal frame 21 rotates on the axle 29, the platform 11 will have a component of rotation about the horizontal axis perpendicular to the horizontal axis aligned with the axles 19. The torquer 33 will rotate the gimbal frame 21 until the applied output signal from the resolver 47 is 0. When both output signals from the resolver 47 are 0, the output signals from the gyros 41 and 43 will be 0 and the platform 11 will be unpivoted about both of its horizontal axes 35 and 37. Thus the axis of the platform coaxial with the gimbal axle 13 will be aligned with vertical. In this manner the platform 11 is maintained in alignment with its initial position in respect to inertial space.

The above described platform is a conventional three gimbal stable platform system. The present invention provides means in this system to reduce the drift of the platform that occurs when the platform 11 and the gyros 39, 41 and 43 mounted on the platform are subjected to high linear acceleration, vibration and shock such as occurs during the boost phase of rocket flight. The drift of the platform 11 from its initial alignment will occur because the drift rate of the gyros 39, 41 and 43 will substantially increase when these gyros are subjected to disturbances such as linear acceleration, vibration, and shock due to their anisoelasticity and unbalance. In accordance with the present invention three angular accelerometers 53, 55 and 57 are mounted on the platform 11. The angular accelerometer 53 senses the angular acceleration of the platform 11 about the horizontal axis 35. The angular accelerometer 55 senses the angular acceleration of the platform 11 about the horizontal axis 37 and the angular accelerometer 57 senses the angular acceleration about the vertical axis of the platform 11 coaxial with the axle 13. The output signal from the angular accelerometer 53 is applied to an integration unit 59, which in response to the output signal from the accelerometer 53 produces an output signal proportional to the double integral of the acceleration about the axis 35. Thus the output signal of the integration unit 59 will be proportional to the amount that the platform 11 has rotated about the axis 35 from its initial position. Thus, when the gyro 41 drifts causing the platform 11 to drift in rotation about the axis 35, the integration unit 59 will produce an output signal proportional to the drift angle. This output signal is applied to the torquer of the gyro 41 with a polarity to cause the gyro 41 to precess about the axis 35 in a direction to reduce the drift angle of the platform 11 about the axis 35. In this manner the drift of the platform 11 about the axis 35 is reduced. The output signal of the angular accelerometer 55 is applied to an integration unit 61, which is response to the applied signal produces an output signal proportional to the double integral of the angular acceleration about the axis 37 and therefore proportional to the drift angle of the platform 11 about the axis 37. This output signal is applied to the torquer of the gyro 43 to reduce the drift of the platform about the axis 37. The output signal of the angular accelerometer 57 is applied to an integration unit 63, which in response to the applied signal produces an output signal proportional to the double integral of the angular acceleration about the vertical axis of the platform and therefore proportional to the drift angle of the platform about the vertical axis of the platform. This output signal of the integration unit 63 is applied to the torquer of the gyro 39 to reduce the drift of the platform about the vertical axis of the platform. In this manner the drift of the platform 11 about all three axis is reduced to a minimum. The output signals of the integration units 59, 61 and 63 are applied to the torquers of the gyros 41, 43 and 39 to reduce the drift of the platform in this manner during the boost phase of the rocket flight so that the platform drift, which would normally be high during this period is reduced to a minimum.

The invention is not restricted to a three gimbal stable platform. It can be used to reduce the drift of any gyro which is subjected to disturbances such as high linear acceleration, vibration or shock. The angular accelerometer must merely be mounted to sense the angular acceleration of the gyro about its sensitive axis. If a two-axis gyro is used, then the acceleration about both sensitive axis of the gyro should be detected.

In the preferred embodiment of the invention, in order to reduce the amount of integration error in the system of the invention, angular accelerometers having a digital capture mode are used. Such angular accelerometers will produce output pulses per unit time proportional to the angular acceleration sensed by the angular accelerometers. FIGURE 2 is a block diagram of the circuit for the integration units 59, 61 and 63, which circuit is designed to operate in response to the pulse output from an angular accelerometer using a digital capture mode. As shown in FIGURE 2, the pulses from the angular accelerometer are applied to a counter 65 which counts in one direction in response to pulses from the angular accelerometer indicating acceleration in one direction and counts in the opposite direction in response to pulses from the angular accelerometer indicating acceleration in the opposite direction. The count registered by the counter will be proportional to the integral of the angular acceleration sensed by the angular accelerometer and hence will be proportional to the angular rate of rotation. Signals representing the count stored by the counter 65 are applied to a gate 67 which is periodically enabled by a clock-pulse generator 68 at a constant frequency. Each time the gate 67 is enabled it applies the output signals from the counter 65 representing the count registered therein to an accumulator 69, which algebraically adds the number represented by the signals to its contents and stores the sum. The number stored by the accumulator 69 will represent the integral of the count registered by the counter 65 and hence will represent the angle of rotation. Signals representing the number stored in the accumulator 69 are applied to a digital to analog converter 71 which in response to the applied signals produces an analog output signal proportional to the number represented by the applied signals. The output signal from the digital to analog converter 71 is the output signal of the integration unit and is the torquing signal applied to the gyro to reduce its drift.

The above description is of a preferred embodiment of the invention and many modifications may be made thereto without departing from the spirit and scope of the invention, which is defined in the appended claims.

What is claimed is:

1. In a stable platform having mounted thereon a gyro for sensing deflection of said platform about an axis of said platform and means to maintain said platform aligned with said gyro, the improvement comprising:

an angular accelerometer mounted on said platform to sense angular acceleration of the platform about said axis and generate an output signal; and means responsive to the output signal of said angular accelerometer to apply to said gyro a torque having a magnitude proportional to the double integral of angular acceleration sensed by said accelerometer in a direction to cause said gyro to precess in the opposite direction from that in which said platform has rotated as a result of said angular acceleration.

2. A system for reducing gyro drift, including:

a gyro for sensing deflection about an axis;

an angular accelerometer fixedly mounted relative to the gyro to sense angular acceleration of the gyro about said axis and generate an output signal; and means responsive to the output signal of said accelerometer to apply to said gyro a torque having a magnitude proportional to the double integral of angular acceleration sensed by said accelerometer in a direction to cause said gyro to precess in the opposite direction from that in which said gyro has rotated as a result of said angular acceleration.

3. In a stable platform having mounted thereon a plurality of gyros sensing deflection of said platform about respective axes of said platform and means to maintain said platform aligned with said gyros, the improvement comprising:

respective angular accelerometers mounted on said platform to sense angular acceleration of said platform about said axes of said platform and generate respective output signals; and means, responsive to the output signals of each of said angular accelerometers, to apply to said respective ones of said gyros torques having magnitudes proportional to the double integrals of angular accelerations sensed by said accelerometers in directions to cause said gyros to precess about said axes in the directions opposite those in which said platform has rotated as a result of said angular accelerations.

4. In a stable platform having mounted thereon a gyro sensing deflection of said platform about an axis of said platform and means to maintain said platform aligned with said gyro, said gyro having a torquer energizable to cause said gyro to precess about said axis, the improvement comprising:

an angular accelerometer mounted on said platform to sense angular acceleration of said platform about said axis and generate an output signal;

means responsive to the output signal of said accelerometer to generate a signal proportional to the double integral of angular acceleration sensed by said accelerometer; and means to apply said proportional signal to the torquer of said gyro with a polarity to cause said gyro to precess about said axis in the opposite direction from that in which said platform has rotated as a result of said angular acceleration.

5. A system for limiting gyro drift comprising:
a gyro sensing deflection about an axis and having a torquer energizable to cause said gyro to precess about said axis;
an angular accelerometer mounted to sense acceleration of said gyro about said axis and generate an output signal;
means responsive to the output signal of said angular accelerometer to generate a signal proportional to the double integral of said output signal; and
means to apply said proportional signal to the torquer of said gyro with a polarity to cause said gyro to precess about said axis in the opposite direction from that in which said gyro has rotated as a result of said angular acceleration.

6. In a stable platform having mounted thereon a plurality of gyros sensing deflection of said platform about respective axes of said platform and means to maintain said platform aligned with said gyros, the improvement comprising:
respective angular accelerometers mounted on said platform to sense angular accelerations thereof about said axes;
means responsive to the output signals of said accelerometers to produce signals proportional to the double integrals of the accelerations sensed by said accelerometers; and
means to apply said signals severally to the torquers of the respective ones of said gyros with polarities to cause said gyros to precess about said axes in directions opposite to those in which the platform has rotated about said axes as a result of said accelerations.

7. An inertial guidance system comprising:
a platform;
gimbal means mounting said platform for rotational displacement about orthogonally-related axes, individual platform torquing means operatively connected to said gimbal means and selectively operable to displace said platform about each of said axes;
respective gyro means mounted on said platform for each of said axes, each gyro having a sensing axis aligned with a respective one of said axes and gyro torquing means selectively energizable to cause the gyro to precess about its sensing axis;
means including respective ones of said gyros and platform torquing means defining closed-loop servo systems for stabilizing said platform about said axes in inertial space;
angular accelerometer means mounted on said platform and adapted to sense acceleration about each of said axes and generate respective output signals representative of the acceleration about each of said axes; and
means for generating a signal corresponding to the double integral of the respective output signals of said angular accelerometer means and applying such double integral signals to the torquing means of the respective ones of said gyro means.

8. An inertial guidance system comprising:
a platform;
gimbal means mounting said platform for rotational displacement about three orthogonally-related axes, individual platform torquing means operatively connected to said gimbal means and selectively operable to displace said platform about each of said axes;
respective gyro means mounted on said platform for each of said axes, each gyro having a sensing axis aligned with a respective one of said axes and gyro torquing means selectively energizable to cause the gyro to precess about its sensing axis;
means including respective ones of said gyros and torquing means defining closed-loop servo systems for stabilizing said platform about said axes in inertial space;
angular accelerometer means mounted on said platform and adapted to sense acceleration about each of said axes and generate respective output signals respresentative of the acceleration about each of said axes; and
means for generating a signal corresponding to the double integral of the respective output signals of said angular accelerometer means and applying such double integral signals to the torquing means of the respective ones of said gyro means.

9. An inertial guidance system comprising:
an outer gimbal member mounted for angular displacement about a first axis;
a torquer connected to said outer gimbal member to torque said gimbal member about said first axis;
an inner gimbal member mounted in said outer gimbal member for angular displacement relative thereto about a second axis normal to the first axis;
a second torquer connected to said inner gimbal member to torque said inner gimbal member about said second axis;
a platform;
means mounting said platform in said inner gimbal member for angular displacement about a third axis, perpendicular to said second axis and the plane of the platform;
a third torquer connected to torque said platform about said third axis and an angle resolver connected to detect angular displacement of said platform relative to said inner gimbal about said third axis;
three single-degree-of-freedom gyros mounted on said platform each with its sensing axis aligned with a respective one of said first, second and third axes, each of said gyros including a torquer selectively energizable to cause the gyro to precess about its sensing axis;
means including said third torquer and the gyro sensing along said third axis forming a closed-loop servo system for stabilizing said platform relative to said third axis;
means including said resolver, said first and second torquers, and the gyros sensing along said first and second axes, forming two additional closed servo loops for stabilizing said platform relative to said first and second axes;
means mounted on said platform for detecting angular acceleration only of said platform about said first, second and third axes thereof and generating individual output signals representative of the acceleration about each axis; and
means for double integrating each of said output signals to generate individual signals representing the degree of angular displacement of said platform about said first, second and third axis, respectively, and applying said signals to energize the torquers of the gyros sensing along said first, second, and third axis, respectively, with a polarity to precess said gyros in the opposite direction from that in which they were displaced by angular displacement of said platform causing the generation of said accelerometer means output signals.

References Cited by the Examiner
UNITED STATES PATENTS 3,057,211 10/1962 Duncan et al. _____ 74—5.34
3,075,393 1/1963 Lindgren _____ 74—5.34

FRED C. MATTERN, JR., *Primary Examiner.*
BROUGHTON G. DURHAM, *Examiner.*
P. W. SULLIVAN, *Assistant Examiner.*